No. 656,045. Patented Aug. 14, 1900.
W. F. RAE.
TIRE AND RIM FOR VEHICLE WHEELS.
(Application filed Mar. 3, 1899.)
(No Model.)
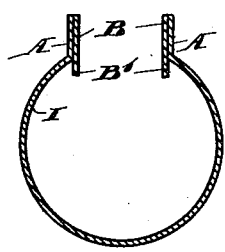
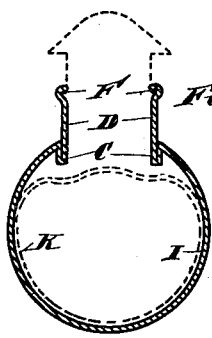
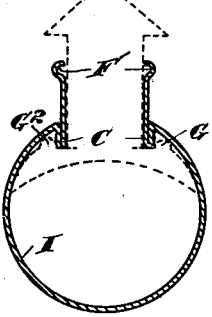
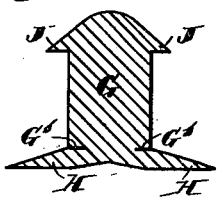
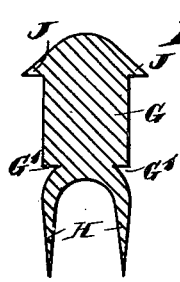
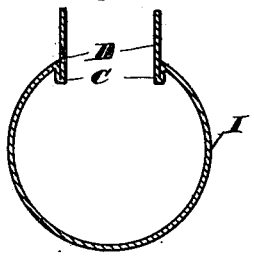
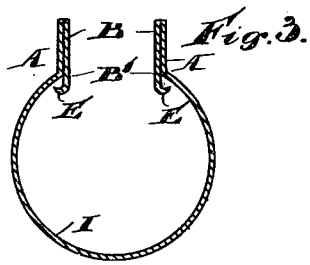
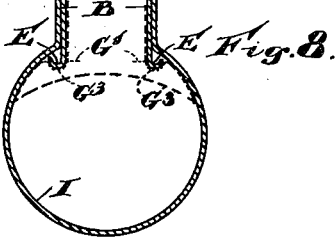
Witnesses—
William Henry Beck
Stephen Edward Gunyon
Inventor—
William Fraser Rae.
THE NORRIS PETERS CO., PHOTO-LITHO., WASHINGTON, D. C.

UNITED STATES PATENT OFFICE.

WILLIAM FRASER RAE, OF LONDON, ENGLAND.

TIRE AND RIM FOR VEHICLE-WHEELS.

SPECIFICATION forming part of Letters Patent No. 656,045, dated August 14, 1900.

Application filed March 3, 1899. Serial No. 707,649. (No model.)

*To all whom it may concern:*

Be it known that I, WILLIAM FRASER RAE, barrister-at-law, a subject of the Queen of Great Britain, residing at 36 Holland Villas road, Kensington, London, in the county of Middlesex, England, have invented certain new and useful Improvements in Tires and Rims of Wheels for Cycles and other Vehicles, (for which I have applied for a patent in England, dated August 13, 1898, No. 17,508;) and I do hereby declare the following to be a full, clear, and exact description of the invention, such as will enable others skilled in the art to which it appertains to make and use the same.

This invention relates to the construction and combination of rims and tires or treads where an air-tube is placed within a metallic rim and part of the tire or tread is contained within that rim.

The object of this invention is to render the metallic rim light and strong, with the minimum of weight, and to form the tire or tread so that it can be easily inserted and withdrawn and that when inserted it will serve as a pneumatic tire when the air-tube is inflated and as a solid or cushion tire when that tube is deflated.

According to my invention the wheel-rim is formed of steel, aluminium, or other suitable material. This rim has an outer peripheral opening, through which the tread portion of the solid outer tire projects, the opening being bounded by flanges projecting outwardly and to a less extent inwardly in relation to the circular portion of the section of the rim. The circular portion of the rim is of a single thickness, the flanges being formed by bending the edges of the metal outward and then inward upon themselves, so that in the preferred form of my invention the portions of the flanges which are outside the rim are of double thickness of metal and the portions inside the rim, forming shoulders therein, are of a single thickness, or the edges of the metal may be first bent inward to form the shoulders and then outward upon themselves, in which case the portions of the flanges which are inside the rim will be of double thickness of metal and the portions outside of a single thickness. I thus produce a rim combining maximum lightness and strength and which may be cheaply manufactured.

Figure 1 in the accompanying sheet of drawings represents the cross-section of a wheel-rim constructed in accordance with the first-described method—namely, by bending the edges of the metal outward, as at A, and then inward upon themselves, as at B, the inner edge forming an inwardly-projecting shoulder B'; and Fig. 2 represents the cross-section of a wheel-rim constructed in accordance with the second-described method—namely, by first bending the edges of the metal inward, as at C, and then outward upon themselves, as at D, the inwardly-projecting shoulder being formed by the fold at C, as shown.

In the construction shown in Fig. 1 a bead may be formed on the edge of the metal forming the shoulder B' inside the rim, as shown at E in Fig. 3, and in the construction shown in Fig. 2 a bead may be formed on the edge of the metal outside the rim, as shown at F in Fig. 4.

The transverse joint of the rim may be made by brazing or other suitable means, or the rim may be made without a transverse joint. This rim is exceedingly light, yet stiff or unyielding in respect to torsional strain. Thus while the parallel flanges may be pressed inward and into contact with comparative ease they resist outward or lateral pressure to a high degree, so that they can be only slightly separated or moved farther apart than their normal distance, even by the application of comparatively-strong lateral pressure. Hence in passing around curves the wheel-tires are in no danger of tilting sidewise.

I construct the solid outer tire G, Figs. 5 and 6 of the drawings accompanying this specification, with a slit or narrow groove G' at each side thereof in such a manner that the outer edges of its flanges or wings H can be brought together or bent more or less parallel to one another, as shown in Fig. 5, and thus be passed readily between the two beforementioned flanges B or D, Figs. 1 to 4, and into the circular body I of the rim, where they again assume their normal position with reference to the solid part G of the tire, as shown in Figs. 4 and 6. These slits or grooves G' also facilitate the locking, as it were, of the flanges or wings H behind the internal shoulders of the rim, as shown by dotted lines in Fig. 4. The flanges or wings H may also be provided with beads G², adapted to take behind the shoulders B' or C, as shown in Fig. 7, or they may be provided with grooves G³, adapted to receive the said shoulders, as shown in Fig. 8, either arrangement facilitating the locking of the flanges or wings H behind the internal shoulders B' or C of the rim.

In order to allow the cycle or wheel to be used, even after the partial or entire deflation of the inner tube, a bead or projection J, Figs. 5 and 6, may be formed on each side of the tread portion G of the solid outer tire, which bead or projection serves to prevent the said tire from being forced to enter beyond a certain distance between the flanges B or D of the rim.

The tire G H can be withdrawn from the rim by simply pulling it outward, when the flanges or wings H close in toward each other and assume the form shown in Fig. 5, so that they may pass out between the flanges B or D of the rim.

The solid tire and the pneumatic tube K are shown in position by dotted lines in Fig. 4.

I claim—

1. A hollow wheel-rim formed of thin metal of uniform thickness, and having a circumferential slot for reception of a solid tire, the opposite edges of said rim being doubled upon themselves, and forming inwardly and outwardly projecting radial, flat, parallel flanges, as shown and described.

2. A hollow wheel-rim constructed of thin metal of uniform thickness, and slotted circumferentially, the opposite edges of the same being bent outward radially, and doubled back, flatwise, upon themselves, and extended inward at B' beyond the bases, as shown and described.

3. In combination with the rim having inwardly and outwardly projecting integral flanges, a rubber tire having a body portion adapted to lie between said flanges and project beyond the same, and wings projecting laterally from the inner edges of said body portion, said tire having inwardly-extending cuts or slits at the angles formed by the meeting of said flanges and body portion whereby said flanges or wings may be brought into line with the body portion for the purpose of inserting or withdrawing the same from the tire, substantially as described.

In witness whereof I have hereunto set my hand in presence of two witnesses.

WILLIAM FRASER RAE.

Witnesses:
WILLIAM HENRY BECK,
STEPHEN EDWARD GUNYON.